United States Patent [19]

Bronstein et al.

[11] Patent Number: 5,910,954
[45] Date of Patent: Jun. 8, 1999

[54] NETWORK SWITCH

[75] Inventors: Zvi Bronstein, Tel Aviv; Eytan Mann, Modin; Eldad Bar-Eli, Ramat HaSharon, all of Israel

[73] Assignee: 3Com Corporation, Santa Clara, Calif.

[21] Appl. No.: 08/910,783

[22] Filed: Aug. 13, 1997

Related U.S. Application Data

[63] Continuation of application No. 08/502,146, Jul. 13, 1995, abandoned.

[30] Foreign Application Priority Data

Aug. 1, 1994 [IL] Israel ......................................... 110537

[51] Int. Cl.[6] ................................................... H04L 12/66
[52] U.S. Cl. ........................... 370/401; 370/466; 370/471
[58] Field of Search ..................................... 370/401–405, 370/465, 466, 469, 470, 471

[56] References Cited

U.S. PATENT DOCUMENTS

| | | | |
|---|---|---|---|
| 4,975,906 | 12/1990 | Takiyasu et al. | 370/85.13 |
| 5,144,622 | 9/1992 | Takiyasu et al. | 370/85.13 |
| 5,280,481 | 1/1994 | Chang et al. | 370/85.13 |
| 5,287,535 | 2/1994 | Sakagawa et al. | 370/60 |
| 5,329,527 | 7/1994 | Ujihashi et al. | 370/85.13 |
| 5,363,369 | 11/1994 | Hemmady et al. | 370/60 |
| 5,394,402 | 2/1995 | Ross | 370/94.1 |
| 5,408,469 | 4/1995 | Opher et al. | 370/94.1 |
| 5,414,707 | 5/1995 | Johnston et al. | 370/79 |
| 5,425,026 | 6/1995 | Mori | 370/60 |
| 5,425,029 | 6/1995 | Hluchyj et al. | 370/94.1 |
| 5,453,980 | 9/1995 | Van Engelshoven | 370/94.2 |
| 5,600,644 | 2/1997 | Chang et al. | 370/404 |

OTHER PUBLICATIONS

Biagioni, et al., "Designing a Practical ATM LAN", *IEEE Network*, pp. 32–39, Mar. 1993.
3COM Corporation, "Blueprint for Bandwidth", *NetAge*, vol. 3, No. 1, Jan./Feb. 1994.

*Primary Examiner*—Melvin Marcelo
*Attorney, Agent, or Firm*—Wilson, Sonsini, Goodrich & Rosati; Mark A. Haynes

[57] ABSTRACT

A network having at least one emulated local area network (LAN) therein includes groups of legacy LAN workstations, network switches and an ATM switch. The network switches are each connectable to one of the groups of the legacy LAN workstations. The ATM switch is connectable to the network switches and each network switch includes a cell memory, a cell memory manager, local switching apparatus and remote switching apparatus. The cell memory stores cells of data. The cell memory manager converts data back and forth between a format and a cell format, stores the cell format data in the cell memory and retrieves calls therefrom. The local switching apparatus locally switches cells of data among the group of legacy LAN workstations connectable to the network switch. The remote switching apparatus switches the cells of data from the network switch to a remote network switch via the ATM switch.

8 Claims, 10 Drawing Sheets

NETWORK SWITCH

This application is a continuation of application Ser. No.: 08/502,146, filed Jul. 13, 1995 now abandoned.

FIELD OF THE INVENTION

The present invention relates to network switches in general.

BACKGROUND OF THE INVENTION

There are many types of data communication networks, such as local and wide area networks (LANs and WANs), which connect together a multiplicity of computers. LANs connect computers which are close together and WANs connect computers which are far apart, respectively. LANs are implemented in a number of protocols, such as ETHERNET, Token Ring and Fiber Distributed Data Interface (FDDI). A more recent type of network protocol is the asynchronous transfer mode (ATM) protocol which is useful for both LANs and WANs. ATM networks, which are networks based on the ATM protocol, are connection-oriented in a manner similar to the telephone system.

Unfortunately, the various networks are incompatible with each other and therefore, if a user wants to take advantage of the qualities of the ATM networks, he must remove his old network and install a new ATM one.

Furthermore, most networks are not easily reconfigured. Typically, the workstation at which one person works is fixed in his room and is part of only one group of computers. For example, the groups might be the accounting and the engineering departments. If the user moves to a different room, the network has to be reconfigured, typically through bridges and routers, in order to access his new location. Similarly, if he changes groups but stays in the same room, the network has to be reconfigured. Any change typically also requires extensive management involvement.

SUMMARY OF THE PRESENT INVENTION

It is therefore an object of the present invention to provide a network switch which eases the problems described hereinabove.

There is therefore provided, in accordance with a preferred embodiment of the present invention, a network including asynchronous transfer mode (ATM) workstations, an ATM switch, legacy LAN workstations and at least two network switches. The ATM switch is connectable to a multiplicity of ATM workstations and the network switches are each connectable to a different multiplicity of the legacy LAN workstations and also to the ATM switch. Each network switch includes apparatus for converting back and forth between a legacy LAN protocol and an ATM protocol and apparatus for creating at least one emulated LAN from some of the legacy LAN and ATM workstations.

Additionally, in accordance with a preferred embodiment of the present invention, the apparatus for converting includes a cell memory and a cell memory manager. The cell memory stores fixed length cells of message data and the cell memory manager for inputing and outputing queues of cells which form a message.

Moreover, in accordance with a preferred embodiment of the present invention, the apparatus for converting also includes legacy LAN and ATM interface units for communicating respectively with the legacy LAN and the ATM workstations. On input, the legacy LAN interface unit breaks a legacy LAN message into a plurality of cells and, on output, provides a plurality of cells as a single message.

Furthermore, in accordance with a preferred embodiment of the present invention, the apparatus for creating includes an address translation unit having a map of the network and a listing of which legacy LAN and ATM workstations belong to which of the emulated LANs. The listing includes a listing of which legacy LAN workstations require that their messages be converted to the ATM protocol in order to pass through the ATM switch.

Additionally, in accordance with a preferred embodiment of the present invention, the cell memory manager receives translation information from the address translation unit.

Finally, in accordance with a preferred embodiment of the present invention, the legacy LAN interface unit includes a flow control unit having a queue of messages to be sent. The flow control unit indicates to an ATM interface on a remote ATM workstation whenever the legacy LAN interface is about to start sending a message for which not all of its cells are stored in the queue.

BRIEF DESCRIPTION OF THE DRAWINGS

The present invention will be understood and appreciated more fully from the following detailed description taken in conjunction with the drawings in which:

FIGS. 3A, 3B and 3C are schematic illustrations of data flow through the network switch of FIG. 1, where FIG. 1 illustrates regular communication, FIG. 3B illustrates point to multi-point communication and FIG. 3C illustrates Ethernet bridging;

DETAILED DESCRIPTION OF A PREFERRED EMBODIMENT

Reference is now made to FIGS. 1, 2, 3A and 3B which illustrate a network having a network switch, constructed and operative in accordance with a preferred embodiment of the present invention, and the operation of the switch.

Figure 1:
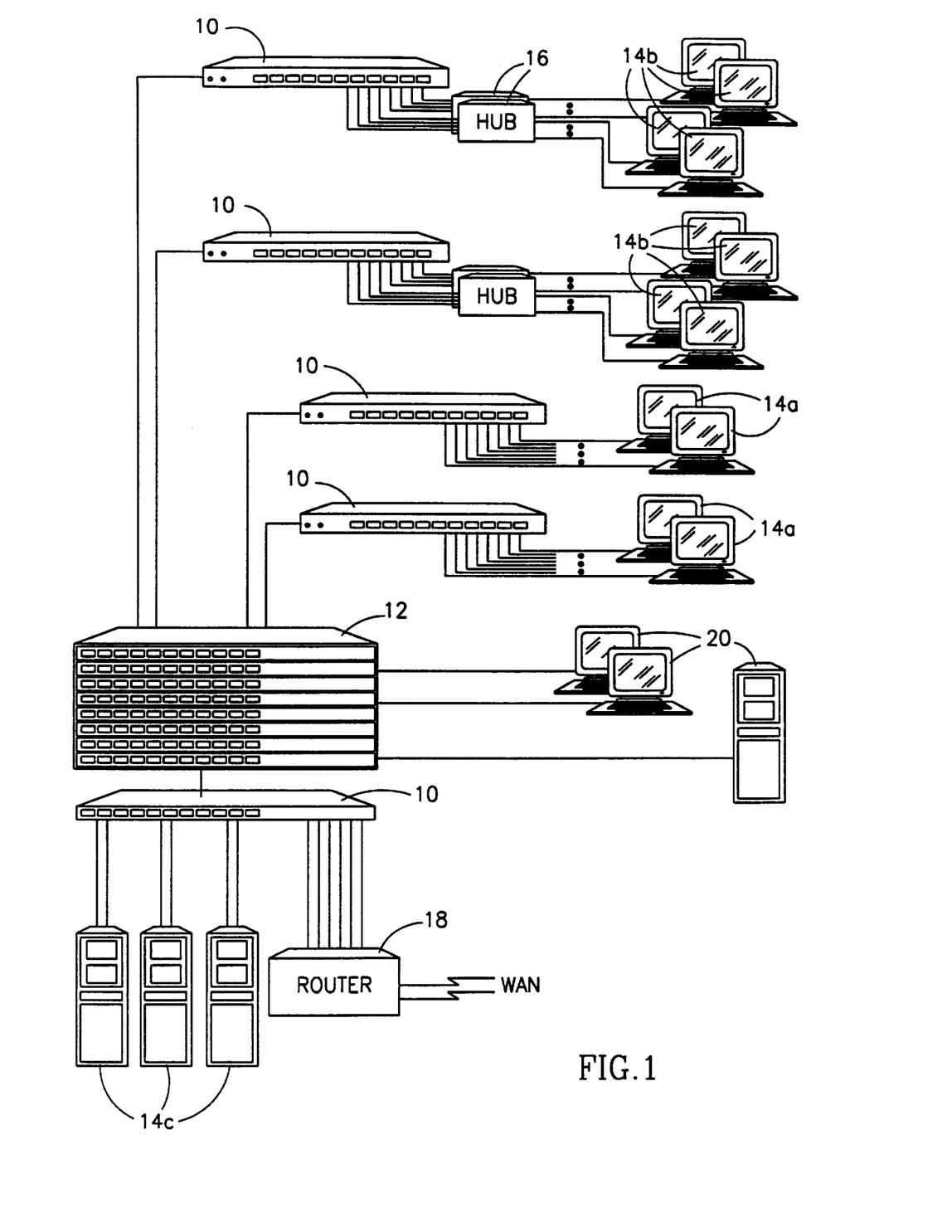
FIG. 1 is a schematic illustration of a network having a network switch constructed and operative in accordance with a preferred embodiment of the present invention.

The network of FIG. 1 typically comprises a plurality of network switches 10, constructed and operative in accordance with a preferred embodiment of the present invention, and an asynchronous transfer mode (ATM) switch 12 connected to each of the network switches 10. For example, the ATM switch can be any of the ATM switches commercially available from SynOptics of Santa Clara, Calif., USA.

Each network switch 10 is also connected to a multiplicity of "Legacy LAN" workstations 14, where the term "legacy LAN" denotes an Ethernet, Token Ring or FDDI network. Each legacy LAN workstation 14 has a legacy LAN controller card therein and is connected either directly (workstations 14a) or indirectly through a hub 16

(workstations 14b) to the relevant network switch 10. Workstations 14c are servers and are shown directly connected to a network switch 10. Switches 10 can also be connected to a router 18 which connects the network shown in FIG. 1 to another network, marked WAN. The other network can be any type of network and does not have to be a WAN as marked.

The ATM switch 12 is also connected to a multiplicity of ATM workstations 20, each having an ATM controller card therein.

Figure 2:
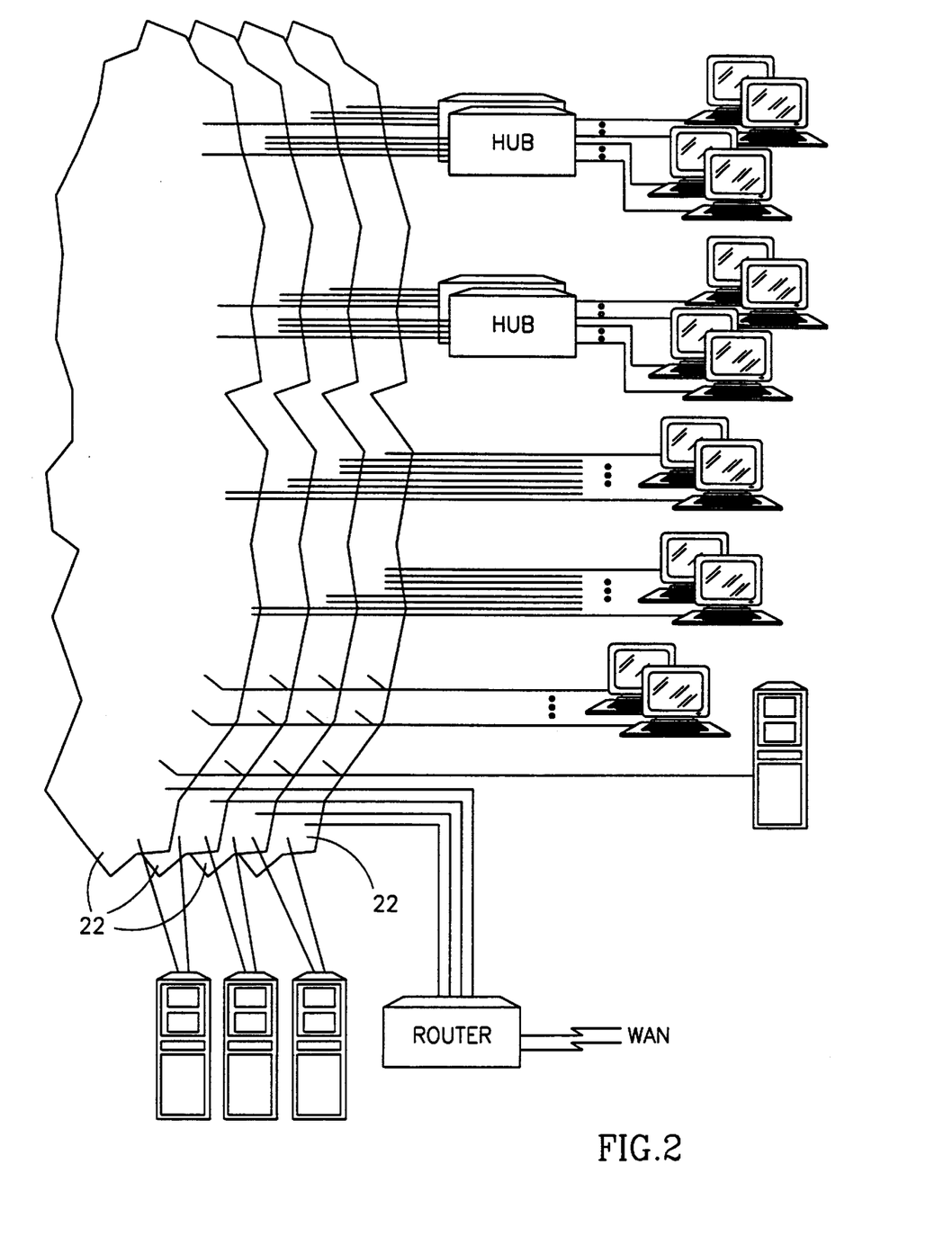
FIG. 2 is a schematic illustration of the emulated network which the network switch of FIG. 1 creates.

The switches 10 of the present invention perform a number of operations. They provide communication among the legacy LAN workstations 14 and between legacy LAN workstations 14 and ATM workstations 20. As shown in FIG. 2 and in accordance with the present invention, switches 10 create one or more interconnected emulated networks 22 to which any of legacy LAN workstations 14a–14c and ATM workstations 20 can be attached. All traffic within an emulated network 22 is switched while traffic between emulated networks 22 is routed.

Typically, each emulated network 22 is provided to one working group in a company. If someone from one group changes rooms, no routing or recabling is required; his new workstation is just redefined to belong to his old emulated network 22. Similarly, if someone changes groups, his old workstation is just redefined to belong to his new emulated network 22. Thus, the network described in FIG. 2 is "location independent", meaning that the user is connected to his network no matter where he is. Furthermore, with an emulated network 22, the changes of location or group do not entail performance degradations.

Each workstation 14 is connected to the network switch 10 in its vicinity, regardless of the emulated network 22 to which the workstation 14 belongs. Each network switch 10 stores within it the emulated LAN 22 to which each of its connected workstations 14 belongs and enables the communication within and between emulated LANs 22.

It is noted that the ATM workstations 20 are not connected to network switches 10 but rather, are directly connected to the ATM switch 12. Because of this, for the ATM workstations 20 to be part of an emulated LAN, their ATM controllers must include in them units for producing emulated LANs. Otherwise, they can only communicate with other ATM workstations 20.

It will be appreciated that the type of workstation the user has is of little importance, since the switches 10 provide the necessary transformations between the legacy LAN and ATM communication protocols. It will be appreciated that the network switches 10 can convert between any legacy LAN protocol and the ATM protocol. Since the FDDI protocol is similar to the Ethernet one, FDDI and Ethernet workstations can be part of the same emulated LAN. Token Ring workstations, however, must either form a separate emulated LAN or incorporate an external mechanism by which to convert the Token Ring protocol to the Ethernet protocol.

Figure 3A:
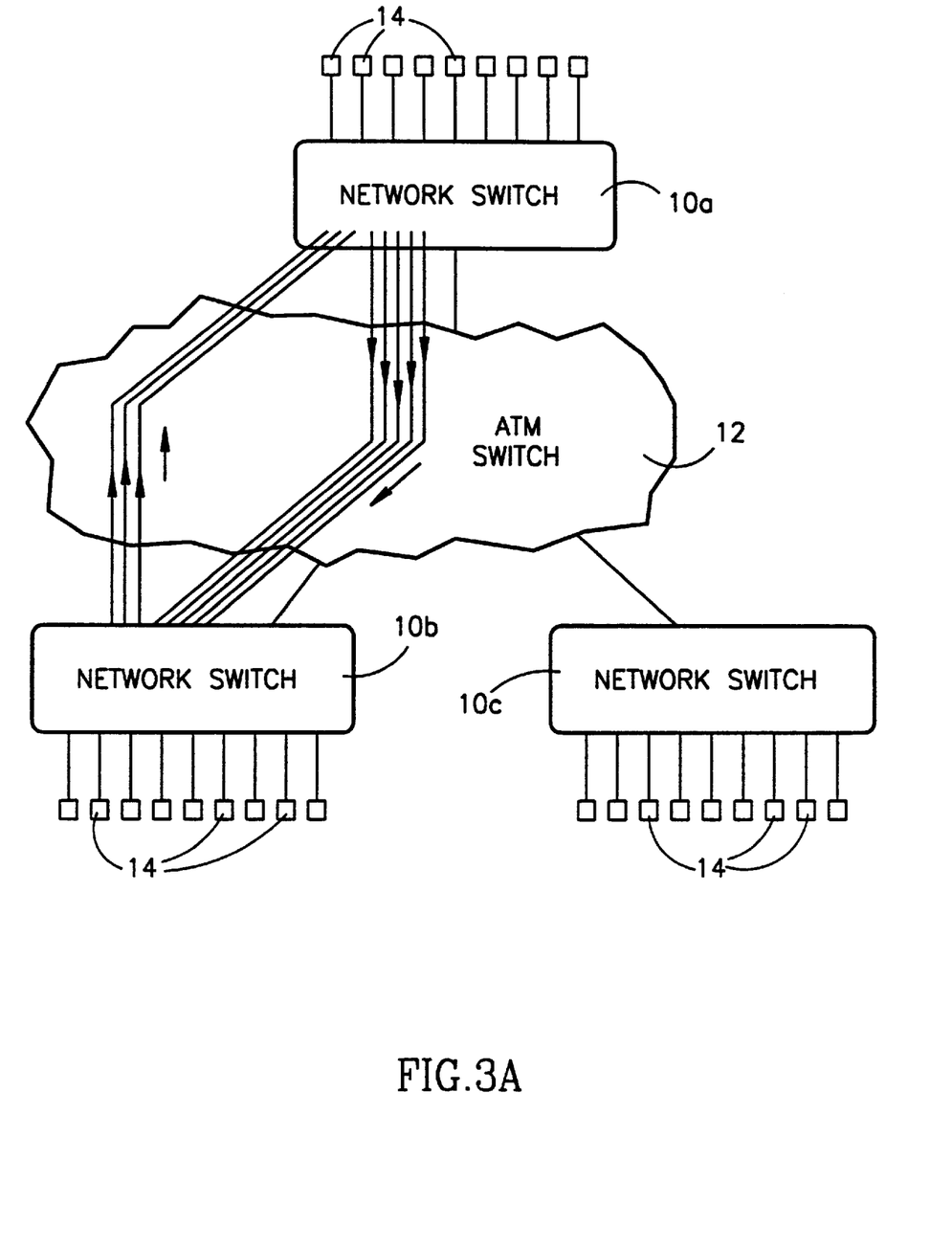
Figure 3B:
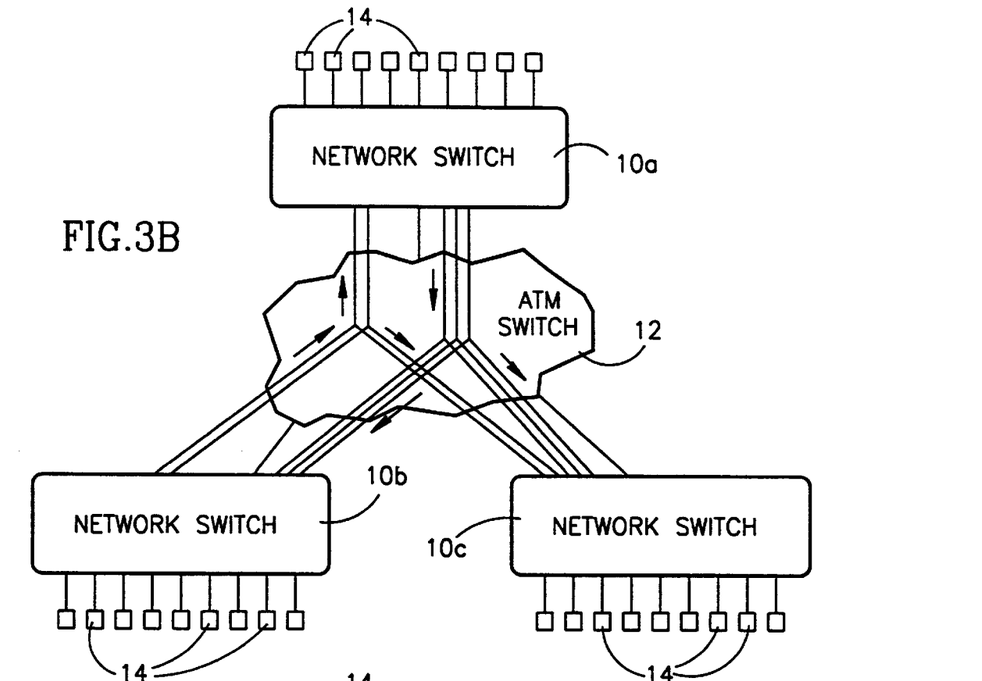
Figure 3C:
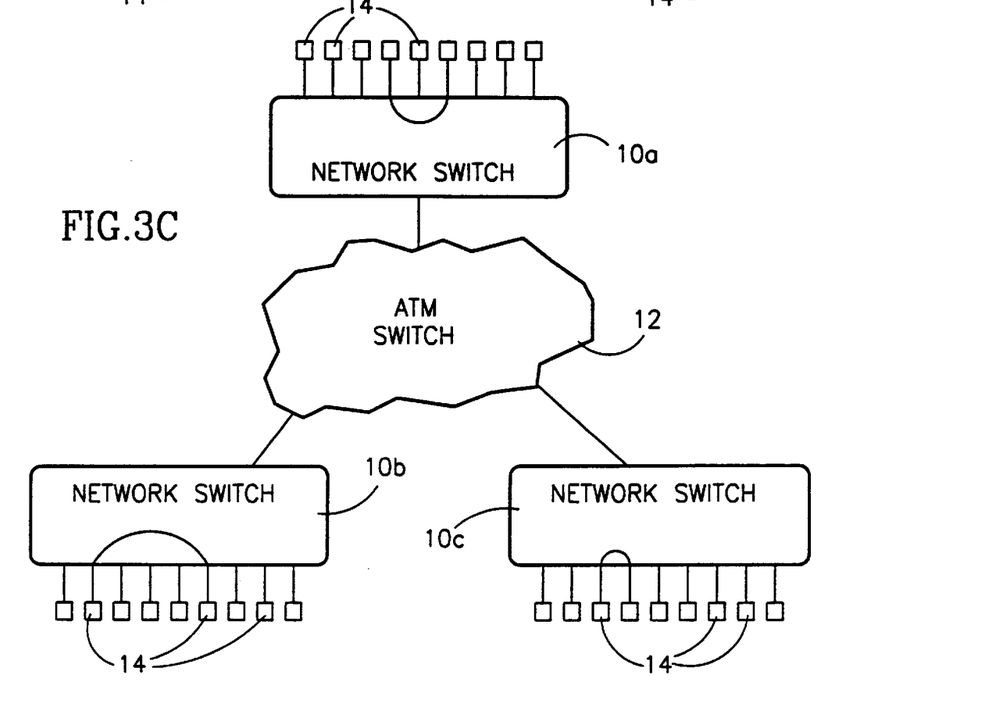

FIGS. 3A, 3B and 3C illustrate the ATM switch 12 with three network switches 10, 10b and 10c. In FIG. 3A, regular communication between switch 10a and switch 10b is shown. As can be seen, the data packet passes through the ATM switch 12, since the switches 10 are connected to each other through the ATM switch 12.

In FIG. 3B, point to multi-point communication is shown in which data packets from one network switch are provided to the other two network switches. FIG. 3B shows three such communications. Once again, the data packets pass through the ATM switch 12.

In FIG. 3C, "switching" or communication between legacy LAN workstations 14 connected to a single network switch 10, is shown. In this case, communication between the workstations does not pass through the ATM switch 12.

If desired, the network switches 10 can perform the simple network management protocol (SNMP) which enables network management units to communicate with the network switches 10 to ascertain and change operation parameters.

Figure 4:
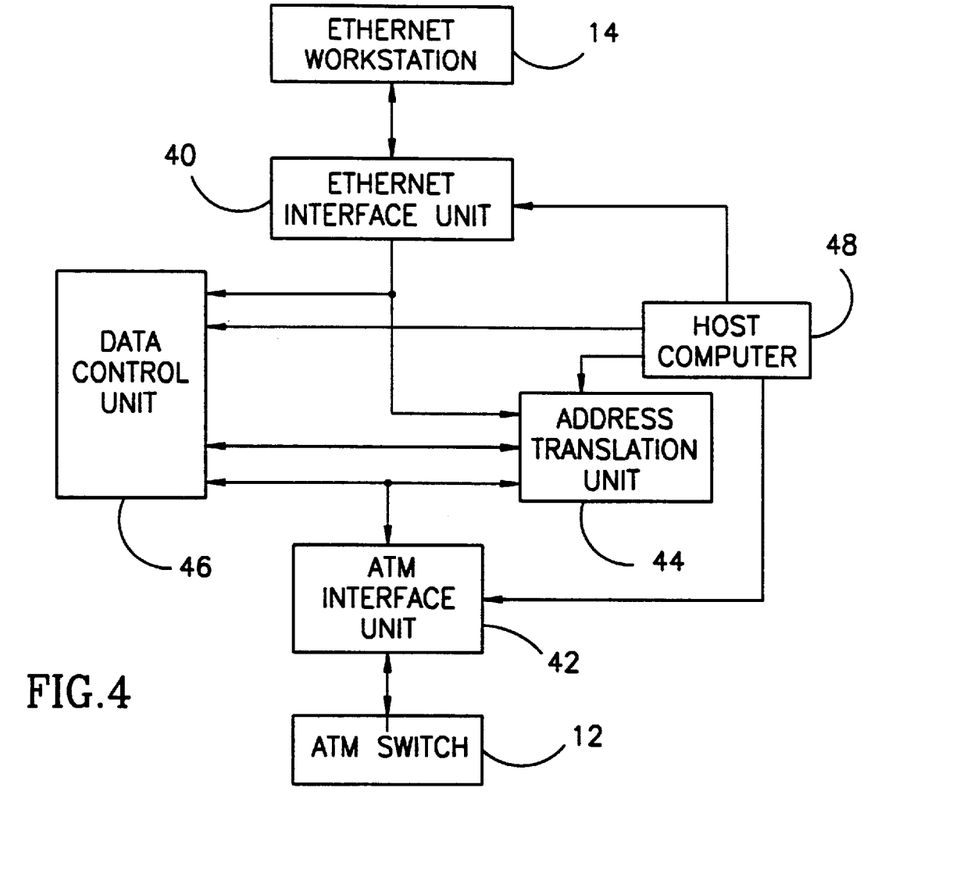
FIG. 4 is a block diagram illustration of the network switch shown in FIG. 1.
Figure 5:
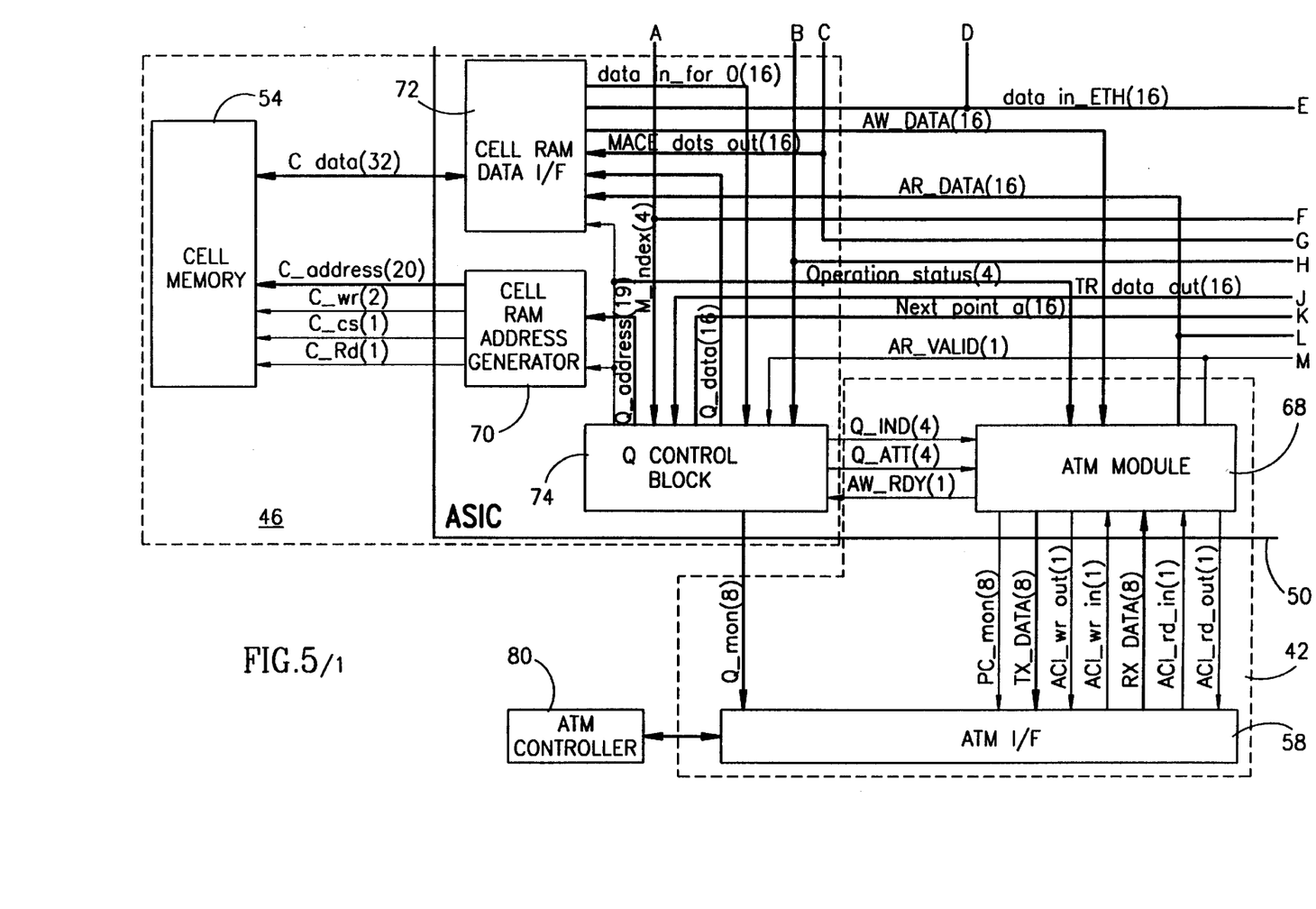
FIG. 5 is a more detailed illustration of the network switch of FIG. 4.
Figure 6:
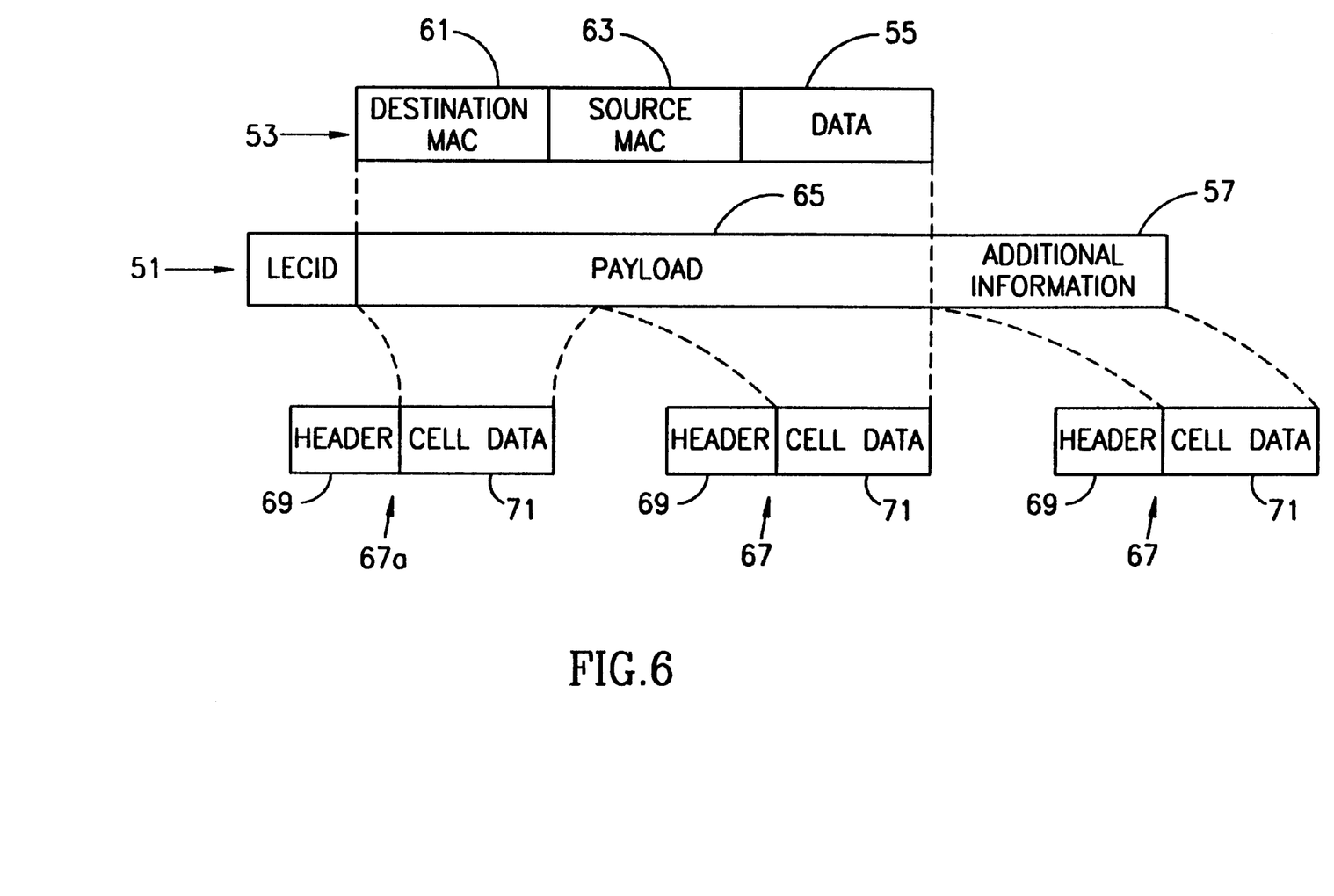
FIG. 6 is a schematic illustration of Ethernet and ATM messages and their relationship, useful in understanding the network switch of FIG. 4.

Reference is now made to FIGS. 4 and 5 which illustrate the elements of a network switch 10, to FIG. 6 which is useful in understanding the operation of the network switch 10 of FIGS. 4 and 5, and to FIG. 7 which illustrates the structure of a cell memory of switch 10. FIGS. 4–6 illustrate the switch 10 in the context of switching between the Ethernet and ATM protocols. It will be appreciated that similar constructions are required for the FDDI and Token Ring protocols.

The network switch 10 typically comprises Ethernet and ATM interface units 40 and 42 (FIG. 4), respectively, an address translation unit 44, a data control unit 46 and a host computer 48. The Ethernet and ATM interface units 40 and 42, respectively, convert messages to and from the Ethernet and ATM protocols from and to the internal protocol of the network switch 10, which, in the switch of FIGS. 4–6, is the AAL5 ATM frame format. The Ethernet interface unit 40 communicates with the Ethernet workstations 14 to which it is connected and the ATM interface unit 42 communicates with the ATM switch 12.

FIG. 6 illustrates the relationship between an AAL5 frame 51, ATM messages 67 and an Ethernet frame 53. In accordance with the Ethernet format, each Ethernet frame comprises destination and source media access control (MAC) addresses 61 and 64 and a variable length data portion 55. The length of data portion 55 is variable up to a maximum, standardized length. FDDI frames are organized similar to Ethernet frames.

The AAL5 frame 51 takes the Ethernet frame 53 as its payload 65 and adds to it a LAN emulation header (LECID) and some additional information 57 which includes the length of the payload 65, an error code and padding to reach a desired cell length.

Each ATM cell 67 comprises a header 69 and a fixed length cell data 71 forming part of the AAL5 frame 51. As shown in FIG. 6, the payload 65 of the AAL5 frame 51 may be divided among a number of ATM cells 67 and the additional information 57 may form the payload of another ATM cell 67. It is noted that the first cell data 71 corresponding to an AAL5 frame 51 includes in it the source and destination MACs 61 and 63 of the Ethernet frame 53.

The address translation unit 44 performs the LAN emulation, forwards and filters the messages passed through the switch. It also learns about and ages the topology of the network. The learning and aging activities are standard operations performed by standard bridges and routers. In learning, the network device, in this case the network switch 10, records the port at which each station resides and utilizes this information when forwarding messages to that station. In aging, if a station has not been seen after a predetermined length of time, it is removed.

The address translation unit 44 knows to which emulated network 22 each workstation belongs. Unit 44 receives each message and monitors the MAC address portions. It then determines what type of conversion, if any, must be performed on the message. If the incoming message is from an Ethernet workstation 14 and is to be sent to another Ethernet workstation attached to the same network switch 10, the message will initially be converted to the AAL5 internal protocol and will be converted back to the Ethernet protocol on transmission. Otherwise (if it is to go to an ATM workstation 20 or to an Ethernet workstation attached to a different network switch 10), the message will eventually be converted from the internal AAL5 protocol to the ATM protocol. Conversely for a message from an ATM workstation 20.

The address translation unit 44 typically manages a multiplicity of ongoing one-way communications by giving each its own tag which is to be placed into the header 69 of the ATM message. The tag is known herein as the "virtual path/channel identification tag". Some of the communications can be flow control communications which are useful, though not necessary, in controlling the traffic between network switches 10.

The data control unit 46 performs the conversion between the Ethernet and ATM protocols. Unit 46 breaks the incoming messages, which may be of any length, into at least two fixed length cells of data and stores the cells in a managed queue. For the outgoing message, it provides the relevant cell or cells of the message in their proper order. The Ethernet protocol requires a plurality of cells to produce an Ethernet frame while the ATM protocol requires just the cells. The virtual tag maintained by the address translation unit 44 is used to identify which data belongs to which frame of a message.

The host computer 48 typically manages the operation of the network switch 10. It also provides output to network managers as to the activity and efficiency of the network switch 10.

FIG. 5 details one implementation of the network switch 10 and its connection to the Ethernet workstations 14. In this implementation, the switch 10 comprises an application specific integrated circuit (ASIC) 50, a translation memory 52, a cell memory 54, an arbiter 56, an ATM interface 58 and the host computer 48.

The ASIC 50 comprises a timing synchronizer 60, an Ethernet interface 62, a host interface 64, a translator 66, an ATM protocol module 68, a cell memory address generator 70, a cell memory data interface unit 72 and a queue control block 74.

The translation memory 52 and translator 66 form the address translation unit 44. The ATM protocol module 68 and ATM interface 58 form the ATM interface unit 42. The cell memory 54, the address generator 70, data interface unit 72 and queue control block 74 form the data control unit 46. The Ethernet interface 62 and the arbiter 56 form the interface unit 40. Finally, the host interface 64 interfaces between the host 48 and the elements of the ASIC 50.

The ATM module 68 communicates with a single ATM controller 80 and, on input, breaks an ATM cell 67 into its header 69 and cell data 71 portions. If the incoming cell is the first of a series of cells, ATM module 68 removes the source and destination MAC addresses 61 and 63 and provides them to the address translation unit 44. At the same time, ATM module 68 provides the cell data 71 (which includes the MAC addresses 61 and 63) to the data control unit 46. If the incoming cell is not a first cell, ATM module 68 only provides the cell data 71 to the data control unit 46. On output, ATM module 68 receives the relevant data from the data control block 46 and the header information from the translation block 66. The ATM module 68 combines the data and header information together to produce cells 67, where the first cell 67 has all of the address information and some data and subsequent cells 67 only have data.

The translation block 66 analyzes the received addresses, translates them into locations in one of the emulated LANs 22 and determines whether or not the source and destination addresses are permitted to communicate (i.e. are part of the same emulated LAN 22). The topologies of the emulated LANs 22 (e.g. the workstations belonging to each LAN 22) are stored in translation memory 52.

Block 66 determines the direction the message has to go, either to one or more Ethernet workstation connected to the switch 10 and/or to the ATM switch 12 to be sent to one or more ATM workstation. To that end, it controls the queue control block 74, as will be described in more detail hereinbelow.

The translation block 66 performs bridging and aging of addresses, as described hereinabove. Whenever the forwarding address of a workstation changes, the translation block 66 provides this information to the host computer 48.

The arbiter 56 determines which of Ethernet controllers 82, which are connected together along a bus 84, is to communicate with Ethernet interface 62. To do so, arbiter 56 performs a time multiplexing, or round robin, scan of the bus 84, connecting each Ethernet controller 82 with the interface 62, one after the other, for a short period of time.

In accordance with the present invention, rather than communicating an entire frame at once, the Ethernet interface 62 only receives or provides (depending on the direction of the frame) a cell-sized portion of the frame 53 at one time. Therefore, the Ethernet interface 62 must receive or provide a number of times, in accordance with the round robin scan of arbiter 56, before interface 62 finishes communicating the entire frame.

So that the Ethernet controllers 82 can operate according to the Ethernet standard and can receive and send Ethernet frames, rather than cells of frames, arbiter 56 operates at least 20 times faster than the speed of the controllers 82.

Furthermore, to ensure that all the cells which make up an Ethernet frame can be sent one right after the other, the Ethernet and ATM interfaces 62 and 68, respectively, perform flow control through the ATM switch 12. The Ethernet interface 62 has a queue of frames, each consisting of a list of cells, to be sent out. Whenever a frame is read from a queue and the Ethernet interface 62 is about to start sending a frame for which it does not yet have all the cells, it notifies the ATM interface 68 to send a flow control cell to the source network access device. The ATM interface of the source network access device, in turn, raises the priority of the missing cells so that they pass through the ATM switch 12 to the data control unit 46 of the destination network switch 10.

During receipt of a message, the Ethernet interface 62 typically breaks the received partial message into cell-sized data portions and provides them to interface 62. The translation block 66 converts the MAC address portion into an internal address. The interface 62 also provides the cell-sized data to the cell memory interface unit 72 and information regarding the frame to which it belongs to the queue control block 74.

For outgoing messages, the queue control block 74 causes the cell memory interface 72 to provide the cells of the frame, in order. The interface 62 then creates partial messages and provides them to the bus 82. At the same time, it indicates to arbiter 56 to activate the relevant controller 82.

It will be appreciated that, because the interface 62 communicates cells rather than frames, the network switch 10 can begin switching the message to its destination as soon as the first cell arrives. This is known as a "cut-through"

mode. When operating in the cut-through mode, the switching latency (defined as the time it takes for a message to pass through a switch) is very low. The network switch 10 can alternatively operate in a "store and forward" mode in which a frame is transmitted only after it has been completely received.

Figure 7A:
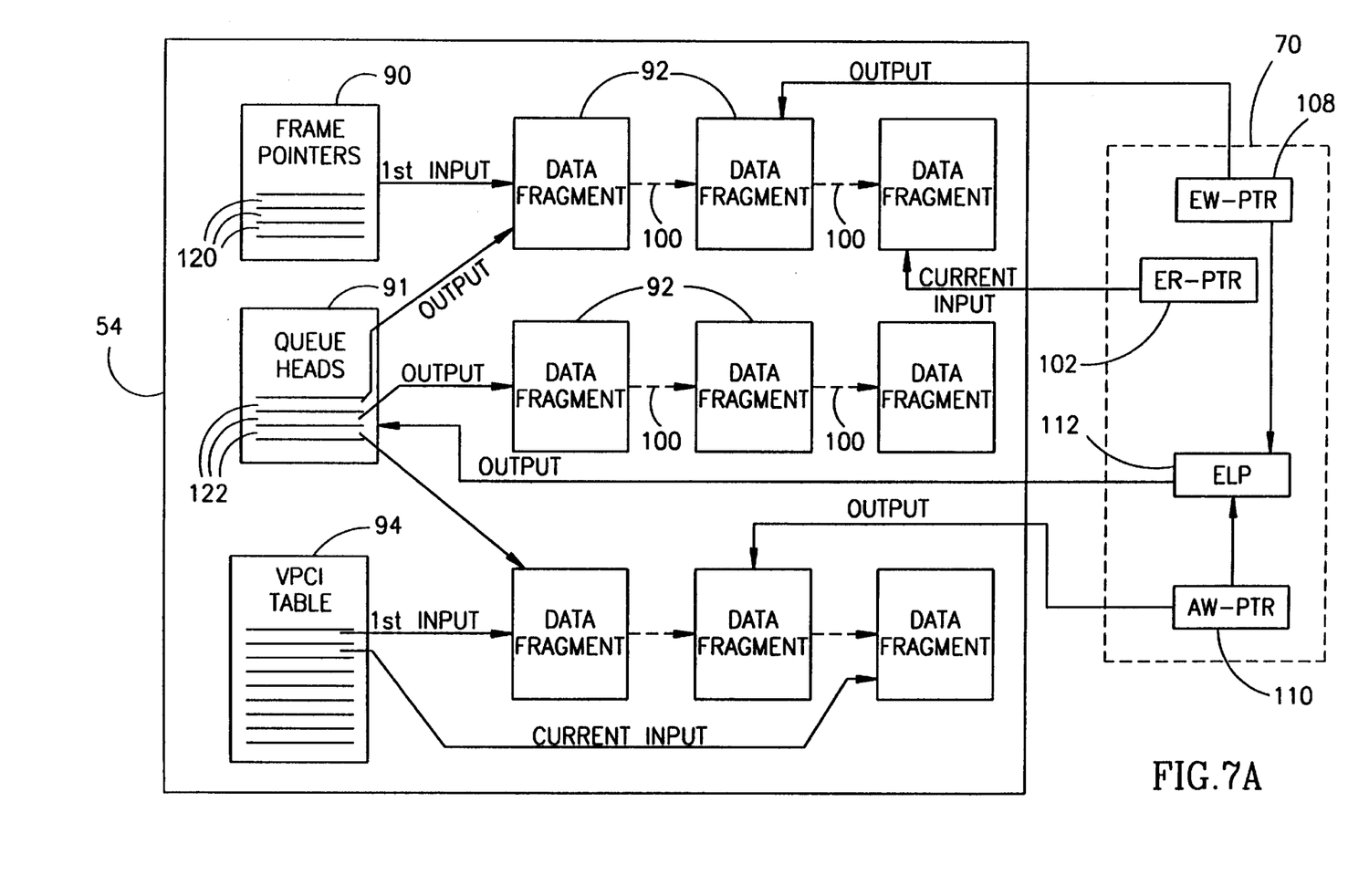
FIG. 7A is a schematic illustration of the structure of a cell memory utilized in the network switch of FIG. 5.
Figure 7B:
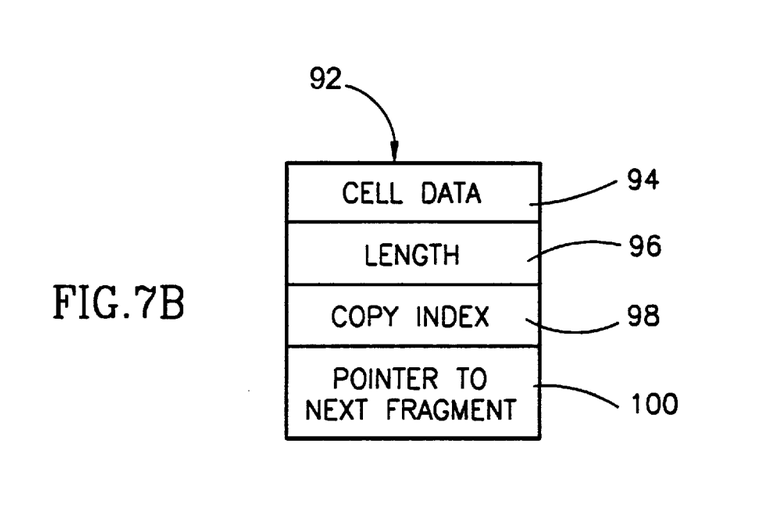
FIG. 7B is a schematic detailed illustration of portions of the cell memory of FIG. 7A.

FIG. 7A illustrates the structure and operation of the cell memory 54 and FIG. 7B is a blowup of a portion of FIG. 7A. The cell memory 54 typically comprises a frame pointer array 90, a queue head array 91, a multiplicity of cell data fragments 92 and a VPCI table 94.

Each data fragment 92 contains a cell of data 94, an element listing the length of useful data in cell 96, a copy index 98 defining how many times the message is to be sent (useful for sending point to multi-point messages) and a pointer 100 to a next fragment. Each queue head, labeled 122, points to a chained series of data fragments 92 available for output. Each frame pointer, labeled 120, points to the beginning of a series of data fragments 92 currently being put into the cell memory 54.

The cell memory is managed by the cell RAM address generator 70 which comprises the following pointers: the Ethernet read (ER) pointer 102, the Ethernet write (EW) pointer 108, the ATM write (AW) pointer 110 and the empty list pointer 112.

An Ethernet frame is entered into the cell memory 54 in cell-sized portions. When the first cell-sized portion of the Ethernet frame arrives, the location of an empty data fragment 92 is taken from the empty list pointer 112 and placed into the appropriate location of both frame pointer array 90 (for input) and the queue head array 91 (for output). This location becomes the frame pointer 120 for the entire incoming frame and the value of the frame pointer 120 is also placed into the ER pointer 102. The first portion of the Ethernet frame is stored into the empty data fragment 92. At the same time, the location of the next empty data fragment is taken from the empty list pointer 112 and stored into data fragment 92 as the pointer 100 to the next data fragment. The value of the pointer 100 is then used to update ER pointer 102.

When the next cell-sized portion of the Ethernet frame arrives, it is stored into the data fragment 92 indicated by ER pointer 102 and the location of the next empty data fragment is taken from the empty list pointer 112 and stored in both pointer 100 of the data fragment 92 and in the ER pointer 102. The process is repeated until all of the portions of the Ethernet frame have arrived.

Since the location of the first cell-sized portion of the frame was put into the queue head array 91, the chained series of cells can be put out (either for ATM or Ethernet use) almost immediately, even while portions of it are still being entered.

On output, the relevant queue head 122, as indicated by the queue control block 74, is read and copied to either the EW pointer 108 (for Ethernet output) or to the AW pointer 110 (for ATM output). The data fragment 92 to which it points is read out via memory interface 72 and the copy index 98 is reduced every time a cell is sent to a destination. Thus, if the message has to be sent five times, to five different destinations, the cell will be removed from memory only after the fifth copy has been sent. Once the last copy has been sent, the location of the data fragment 92 is placed into the empty list pointer 112 since the data fragment is now empty.

Each time the data fragment is read, the value of the pointer 100 in the data fragment 92 is provided to the relevant EW pointer 108, for Ethernet output, and to the AW pointer 110 for ATM output. The relevant pointers then access the next data fragment 92 in the chain. The process is repeated until the entire frame or cell series have been accessed.

Typically, only a small number, such as 12, of Ethernet frames are input at once. In contrast, a large number, such as 100–300, ATM frames are processed at one time. Therefore, there is no ATM read pointer. Instead, the VPCI table 94 includes both the initial cell location pointer and the current cell location pointer. Like for the Ethernet process, the VPCI table 94 receives the location of the next available data fragment form the empty list pointer 112 and, on input, stores the incoming ATM cell in the indicated data fragment. If a series of ATM cells have to be stored, then they are chained together as described for the Ethernet frames with the exception that there is no AR pointer. Instead, the VPCI table 94 continually updates the read pointers.

The ASIC synchronizer 60 provides the basic timing for the ASIC 50. Typically, the operations which the network switch 10 performs are repeated after four clocks. On the first clock, a partial message (typically of four bytes long) is read from one Ethernet controller 82. On the second clock, a partial message is written to one Ethernet controller 82, which is a different controller than that from which a partial message was read. On the third and fourth clocks, messages are received from and written to, respectively, the ATM controller 80.

The host computer 48 manages the operation of ASIC 50. This includes:

a) learning the topology of the emulated LANs;

b) aging of addresses;

c) gathering of statistics;

d) recovering errors;

e) SNMP management; and f) other bridging operations.

It will be appreciated that the present invention enables one or more emulated LANs to be produced from a plurality of existing LANs, whether legacy LAN or ATM or both.

It will further be appreciated that the principles of operation of the network switch 10 provided herein are applicable to other types of legacy LANs. For example, to create a network switch for FDDI networks, the Ethernet controller 82 (FIG. 5) and arbiter 56 must be replaced by an FDDI interface and an FDDI arbiter, respectively. The remaining elements need not be changed. For a Token Ring network, in addition to replacing the Ethernet controller 82 and arbiter 56, the VPCI table 94, routing tables of the translation memory 52 and some of the internals of the ASIC itself, must be changed. However, the basic operation of the data control unit 46 remains the same for all legacy LANs.

It will be appreciated by persons skilled in the art that the present invention is not limited to what has been particularly shown and described hereinabove. Rather the scope of the present invention is defined by the claims which follow:

We claim:

1. A network having at least one emulated local area network (LAN) therein, said network comprising:

at least two groups of legacy LAN workstations;

at least two network switches, each connectable to one of said groups of said legacy LAN workstations;

an ATM switch connectable to said at least two network switches;

wherein each network switch comprises:

a cell memory for storing cells of data;

a cell memory manager for converting data back and forth between a frame and a cell format, for storing said cell format data in said cell memory and for retrieving cells therefrom;

means for local switching of said cells of data among said group of legacy LAN workstations connectable to said network switch; and means for remote switching of said cells of data from said network switch to a remote network switch via said ATM switch.

2. A network according to claim 1 and wherein each said network switch comprises an address translation unit having stored therein a map of said network and a listing of which legacy LAN workstations belong to which of said at least one emulated LAN.

3. A network according to claim 2 and wherein said listing includes a listing of which legacy LAN workstations are connected to said remote network switch and require that their cells be switched through said ATM switch.

4. A network according to claim 2 and wherein said cell memory manager receives translation information from said address translation unit.

5. A network switch connectable to a multiplicity of legacy LAN workstations and to an ATM switch, which, in turn, is connected to a remote network switch, said network switch comprising:

a cell memory for storing cells of data;

a cell memory manager for converting data back and forth between a frame and a cell format, for storing said cell format data in said cell memory and for retrieving cells therefrom;

means for local switching of said cells of data among said group of legacy LAN workstations connectable to said network switch; and means for remote switching of said cells of data from said network switch to said remote network switch via said ATM switch.

6. A network switch according to claim 5 and wherein said network switch comprises an address translation unit having stored therein a map of said network and a listing of which legacy LAN workstations belong to which of said at least one emulated LAN.

7. A network switch according to claim 6 and wherein said listing includes a listing of which legacy LAN workstations are connected to said remote network switch and require that their cells be switched through said ATM switch.

8. A network switch according to claim 6 and wherein said cell memory manager receives translation information from said address translation unit.

* * * * *